United States Patent
Onishi

Patent Number: 5,329,901
Date of Patent: Jul. 19, 1994

[54] HOT SURFACE IMPACT IGNITION TYPE INTERNAL COMBUSTION ENGINE AND METHOD OF HOT SURFACE IMPACT IGNITION

[75] Inventor: Shigeru Onishi, Kanazawa, Japan

[73] Assignee: Nippon Clean Engine Research Institute Co., Ltd., Kanazawa, Japan

[21] Appl. No.: 688,582

[22] PCT Filed: Nov. 16, 1990

[86] PCT No.: PCT/JP90/01500

§ 371 Date: Jun. 27, 1991

§ 102(e) Date: Jun. 27, 1991

[87] PCT Pub. No.: WO91/19085

PCT Pub. Date: Dec. 12, 1991

[51] Int. Cl.$^5$ .............. F02B 23/02; F02M 53/02
[52] U.S. Cl. .................. 123/254; 123/276; 123/298
[58] Field of Search .............. 123/298, 297, 254, 260, 123/276, 279

[56] References Cited

U.S. PATENT DOCUMENTS

| | | | |
|---|---|---|---|
| 1,146,679 | 7/1915 | Winton | 123/298 |
| 1,384,686 | 7/1921 | Christmas | |
| 4,300,497 | 11/1981 | Webber | 123/254 |
| 4,577,601 | 3/1986 | Klak | 123/298 |
| 4,658,772 | 4/1987 | Auth et al. | 123/145 A |

FOREIGN PATENT DOCUMENTS

| | | | |
|---|---|---|---|
| 2915285 | 10/1980 | Fed. Rep. of Germany | 123/254 |
| 3427065 | 1/1986 | Fed. Rep. of Germany | 123/260 |
| 3507459 | 9/1986 | Fed. Rep. of Germany | |
| 595616 | 10/1925 | France | |
| 819724 | 10/1937 | France | |
| 2482195 | 11/1981 | France | |
| 51-42807 | 4/1976 | Japan | |
| 51-151837 | 12/1976 | Japan | |
| 57-2420 | 1/1982 | Japan | |
| 57-69920 | 4/1982 | Japan | |
| 57-150263 | 9/1982 | Japan | |
| 58-35272 | 3/1983 | Japan | |
| 58-82435 | 6/1983 | Japan | |
| 58-106126 | 6/1983 | Japan | |
| 59-25029 | 2/1984 | Japan | |
| 59-45235 | 3/1984 | Japan | |
| 59-41331 | 11/1984 | Japan | |
| 60-3309 | 1/1985 | Japan | |
| 60-128925 | 7/1985 | Japan | |
| 61-108834 | 7/1986 | Japan | |
| 62-34924 | 7/1987 | Japan | |

OTHER PUBLICATIONS

Patent Abstracts of Japan, vol. 9, No. 290, 60128925, Jul. 10, 1985.
Patent Abstracts of Japan, vol. 13, No. 320, 1106920, Apr. 24, 1989.

Primary Examiner—Andrew M. Dolinar
Attorney, Agent, or Firm—Oliff & Berridge

[57] ABSTRACT

An electrically heated heating member (13) is arranged in a cavity formed in the top surface of the piston (2) and fuel is injected from the nozzle (9) of the fuel injector (8) toward the heating surface (15) of the heating member (13) in the form of a continuous fluid stream. This injected fuel strikes the heating surface (15) in the form of a continuous fluid stream and receives heat from the heating surface (15) to atomize and simultaneously disperses inside the cavity (7). Next, the atomized fuel is self-ignited.

20 Claims, 11 Drawing Sheets

HOT SURFACE IMPACT IGNITION TYPE INTERNAL COMBUSTION ENGINE AND METHOD OF HOT SURFACE IMPACT IGNITION

DESCRIPTION

Technical Field

The present invention relates to a hot surface impact ignition type internal combustion engine and a method of hot surface impact ignition for the same.

Background Art

In direct injection type diesel engines or secondary chamber equipped diesel engines, it is necessary to atomize the fuel injected from the fuel injectors to the combustion chambers or secondary chambers as much as possible to mix it fully with air. Therefore, in such diesel engines, it is attempted to atomize the fuel as much as possible when injecting the fuel from the nozzles of the fuel injectors. Further, when the temperature of the combustion chambers or secondary chambers is low such as at engine startup, the atomization of the fuel is insufficient, therefore the combustion chambers or the secondary chambers are provided with glow plugs so as to heat the air in the combustion chambers or the secondary chambers and thereby promote the ignition of the fuel.

Even if the atomization of the fuel injected from the nozzles of the fuel injectors valves is promoted in this way, it takes a certain amount of time until the fuel is sufficiently mixed with the air and the fuel can be ignited even if glow plugs are provided in the combustion chambers or the secondary chambers and this causes ignition lag. If such ignition lag is caused, when ignition is performed, since a large amount of fuel particles already is present in the surroundings, the surrounding fuel is rapidly burned and therefore the combustion pressure in the combustion chambers or the secondary chambers rapidly rises. If the combustion pressure rapidly rises, not only is the problem of a large noise caused, but also there is the problem of generation of a large amount of NOx due to the higher maximum combustion temperature. Further, in such a diesel engine, it is difficult to uniformly disperse the fuel in the combustion chambers or secondary chambers, therefore a region of insufficient oxygen around the fuel particles inevitably occurred. As a result, a large amount of particulates occurred in this region. In so far as fuel is injected from the nozzles of the fuel injectors while being atomized, it is difficult to shorten the ignition lag and further it is difficult to uniformly disperse the fuel in the combustion chambers or the secondary chambers. Therefore, in so far as the fuel is injected from the nozzles of the fuel injectors while being atomized, a large noise is caused and a large amount of NOx is generated and, further, a large amount of particulates is produced.

Compression ignition type engines have the advantage of a high heat efficiency and if compression ignition were possible for gasoline, methanol, and other low cetane number and high octane number fuels, it would be extremely advantageous economically. Such low cetane number and high octane number fuels, however, have extremely long ignition lag times and therefore compression ignition of such fuels has been considered difficult in the past.

Disclosure of the Invention

The object of the present invention is to provide an internal combustion engine and ignition method enabling the acquisition of excellent combustion by self-ignition using any type of fuel which can be used for an internal combustion engine.

According to the present invention, there is provided an internal combustion engine which has an electrically heated heating member arranged in a combustion chamber and which injects fuel from a nozzle of a fuel injector toward a heating surface of the heating member in the form of a continuous fluid stream and makes the fuel strike the heating surface in the form of an unatomized fluid.

Further, according to the present invention, there is provided an ignition method wherein fuel is injected from a fuel injector to the inside of a combustion chamber in the form of a continuous fluid stream and then makes the fuel strike a heating surface of an electrically heated heating member in the form of an unatomized fluid so as to ignite the fuel dispersed after the impact.

BEST MODE FOR CARRYING OUT THE INVENTION

Figure 1:
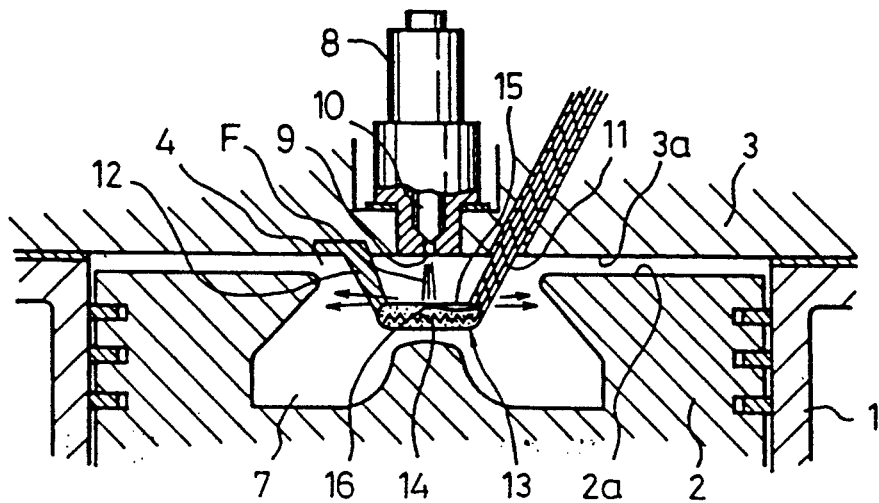
FIG. 1 is a side sectional view of a first embodiment of a hot surface impact ignition type internal combustion engine.
Figure 2:
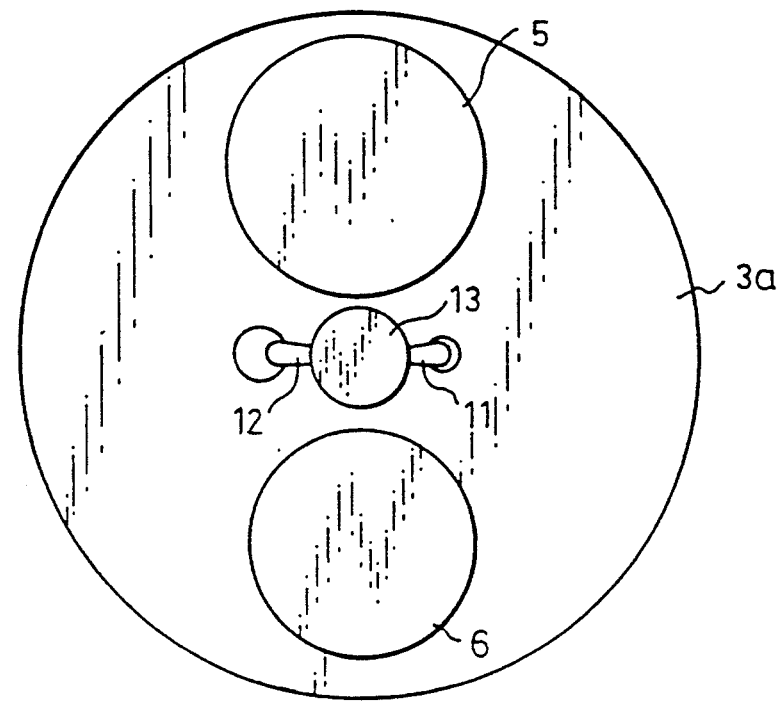
FIG. 2 is a view showing an inner wall surface of the cylinder head in FIG. 1.

FIG. 1 and FIG. 2 show a first embodiment according to the present invention.

Referring to FIG. 1 and FIG. 2, 1 is a cylinder block, 2 is a piston moving reciprocatively in the cylinder block 1, 3 is a cylinder head fastened to the cylinder block 1, 4 is a combustion chamber formed between the piston 2 and the cylinder head 3; 5 is an intake value, and 6 is an exhaust valve. At the center portion of a flat top surface 2a of the piston 2 is formed a cavity 7. At the center portion of the flat inner wall surface 3a of the cylinder head 3 is arranged a fuel injector 8. In the embodiment shown in FIG. 1, the fuel injector 8 is provided with a single nozzle 9 and a needle 10 for controlling the nozzle 9 to open and close, fuel being injected from the nozzle 9 toward the center portion of the cavity 7 when the needle 10 opens the nozzle 9.

At the center portion of the cavity 7 is arranged a heating member 13 of a disc shape supported by the cylinder head 3 via a pair of support members 11 and 12. The heating member 13 is formed, for example, from a heat resistant material such as a ceramic. In the heating member 13 is arranged an electrically heated heating element 14, which heating element 14 heats the heating surface 15 of the heating member 13 facing the nozzle 9. Further, in the heating member 13 is arranged a temperature sensor 16 comprised, for example, of a thermocouple, which detects the temperature of the heating surface 15. The temperature of the heating surface 15 is maintained at a temperature of not less than 650° C. for example about 800° C. which is higher than the compression temperature, by output signals of the temperature sensor 16. Note that instead of using the heating element 14, it is also possible to use a ceramic heater such as a positive characteristic thermistor for the heating member 13 as a whole. In the embodiment shown in FIG. 1, the heating surface 15 is formed from a flat surface substantially parallel to the inner wall surface 3a of the cylinder head. This heating surface 15, however, may also be formed from a convex surface or concave surface with a relatively large radius of curvature.

Fuel is injected from the nozzle 9 of the fuel injector 8 toward the center portion of the heating surface 15 in the form of a continuous fluid stream as shown by F. In the embodiment shown in FIG. 1, the fuel injection is begun about 5 degrees to 15 degrees before the compression top dead center. The fuel injected from the nozzle 9 strikes the center portion of the heating surface 15. At that time, part of the fuel is immediately atomized by the impact energy. The remaining fuel flows in all directions toward the peripheral portions of the heating surface 15 in the form of a flowing film of fluid. Next, this flowing film of fluid splits at the peripheral portions of the heating surface 15 and becomes fuel particulates, which fuel particulates fly off to the surroundings as shown by the arrows in FIG. 1. As mentioned above, part of the injected fuel is immediately atomized after the impact. The atomized fuel robs heat from the heating surface 15 upon impact and becomes high in temperature and therefore can be immediately ignited. Further, the fuel flowing in the form of the flowing film of fuel on the heating surface 15 robs heat from the heating surface 15 while flowing on the heating surface and becomes high in temperature. Therefore, the fuel particulates flying off to the surroundings from the peripheral portions of the heating surface 15 become high in temperature too and therefore the fuel particulates also can be immediately self-ignited. Therefore, the ignition lag time is extremely short, so the fuel injected from the fuel injector 8 is successively burned. As a result, the compression pressure rises gradually, so the generation of noise is suppressed and further the maximum combustion temperature becomes lower, so the generation of NOx is suppressed. Further, the fuel flies off uniformly in all directions from the heating surface 15, so the fuel particulates are uniformly dispersed in the cavity 7 and thus the region of poor oxygen surrounding the fuel particulates almost completely disappears, so the generation of particulates can be suppressed.

What are important in the present invention are that the fuel is injected from the nozzle 9 of the fuel injector 8 in the form of a continuous fluid stream and the injected fuel is made to strike the heating surface 15 in the form of an unatomized fluid and that the heating surface 15 has an area of at least an extent sufficient for giving sufficient heat to the fuel impacting the heating surface 15.

That is, the present invention differs from conventional diesel engines where atomized fuel is injected from the nozzles of the fuel injectors in that when injecting fuel from the nozzle 9 of the fuel injector 8, basically the fuel is not atomized, but the injected fuel is made to strike the heating surface 15 whereby the injected fuel is atomized. Of course, it is impossible to prevent atomization of all of the fuel injected from the nozzle 9 and therefore in actuality part of the fuel injected from the nozzle 9 strikes the heating surface 15 in the form of an unatomized fluid. At this time, there are cases where the fuel strikes the heating surface 15 in the form of a continuous fluid stream and there are cases where it strikes the heating surface 15 in the form of masses of fluid split after injection. In both cases, in the present invention, it is necessary to making the injected fuel strike the heating surface 15 so as to atomize it, so the injected fuel must be made to strike the heating surface 15 at as high a speed as possible. Therefore, the fuel is made to be injected from the nozzle 9 in the form of a continuous fluid stream. That is, the fuel injected in the form of a continuous fluid stream does not slow down in speed much at all until striking the heating surface 15 since it has a large penetrating force and thus the fuel injection pressure of the fuel injected from the fuel injector 8 may even be set to a low pressure of 100 kg/cm² to 150 kg/cm² and the injected fuel can still be made to strike the heating surface 15 at a high speed.

When the fuel atomized in this way is made to be injected from the nozzle of the fuel injector, the penetrating force of the fuel mist is small and the fuel particulates are rapidly decreased in speed to the extent where they may or may not be injected from the nozzle. Therefore, even if a glow plug is arranged in the fuel injection, a small amount of fuel particles striking the glow plug merely float near the glow plug and the high temperature fuel particles are not dispersed in a wide region in the combustion chamber 4, so the effect of reducing the ignition lag is small.

Further, while part of the injected fuel is atomized immediately after the impact, the fuel striking the heating surface 15 in the form of a fluid spreads out in a ring on the heating surface 15 and the fuel spread out in a ring is atomized. Therefore, to give sufficient heat to the fuel spreading out in a ring, the heating surface 15 preferably has at least an area enabling heating of the fuel spread out in a ring. Further, to heat the fuel flowing in the form of a film of fluid on the heating surface 15 toward the peripheral portions thereof, the heating surface 15 preferably has a further larger area.

In the embodiment shown in FIG. 1, the majority of the fuel injected from the nozzle 9 of the fuel injector, i.e., at least 50 percent of the fuel, can be made to strike the heating surface 15 in the form of a fluid. However, even if less than 50 percent of the fuel out of all of the fuel injected from the fuel injector 8 is made to strike the heating surface 15 in the form of a fluid, it was learned that there is a considerable effect of shortening the ignition lag.

Further, since the heating surface 15 is maintained at a high temperature, there is no deposition of carbon etc. on the heating surface 15 and since the dimensions of the heating member 13 are small, once the heating element starts to be powered, the temperature of the heating surface 15 immediately rises and therefore it is possible to secure excellent combustion with an extremely short ignition lag time from the time of engine startup.

FIG. 3 to FIG. 12 show various embodiments. In the embodiments shown from FIG. 3 to FIG. 12, constituent elements the same as in the embodiment shown in FIG. 1 and FIG. 2 are shown by the same reference numerals.

Figure 3:
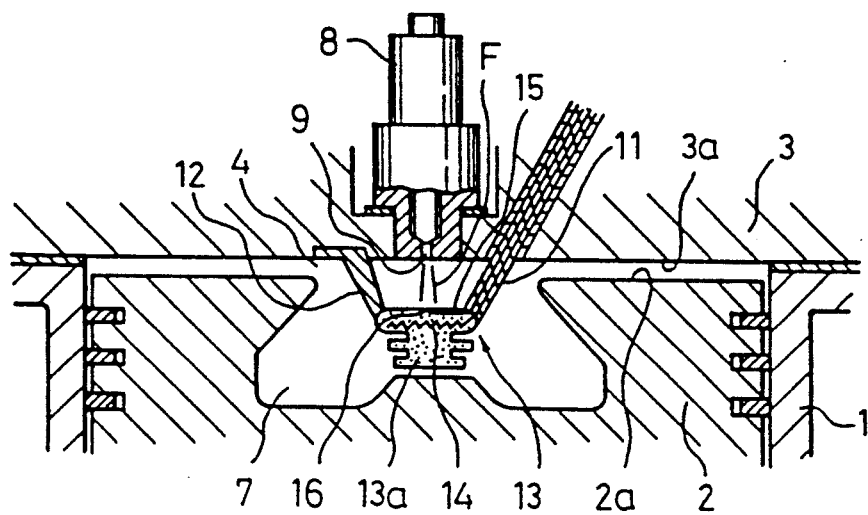
FIG. 3 is a side sectional view of a second embodiment of a hot surface impact ignition type internal combustion engine.

FIG. 3 shows a second embodiment. In this embodiment, the heating member 13 has formed integrally with it a heat receiving portion 13a having a large number of annular fins formed on its lower portion. The heat receiving portion 13a absorbs as much heat of the burning gas as possible and transmits the heat to the heating surface 15, so reduces the power consumption of the heating element 14, for which reason it is provided.

Figure 4:
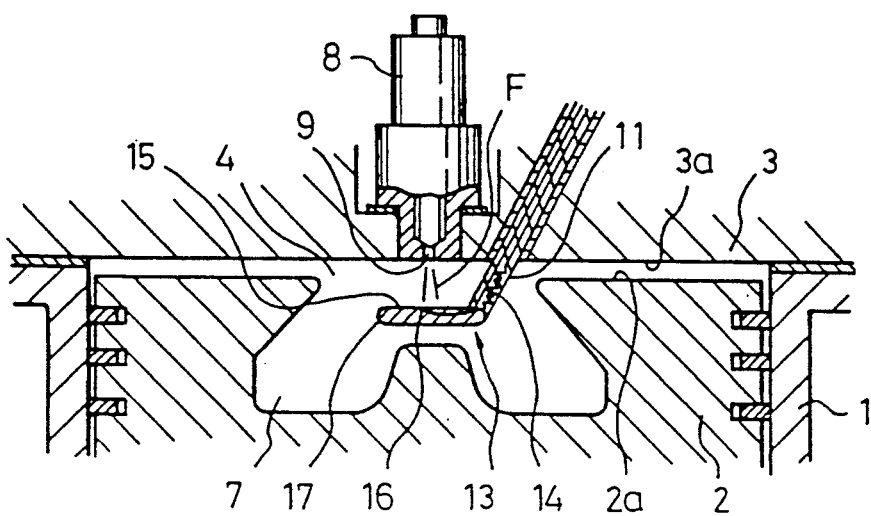
FIG. 4 is a side sectional view of a third embodiment of a hot surface impact ignition type internal combustion engine.

FIG. 4 shows a third embodiment. In this embodiment, a heating element 14 is arranged inside the support member 14 and a heating plate 17 having a good thermal conductivity, for example, made of a metal material, is fixed to the tip portion of the support member 14. The heat generated from the heating element 14 is transmitted by heat conduction to the heating plate 17, whereby the heating surface 15 of the heating plate 17 is heated.

Figure 5:
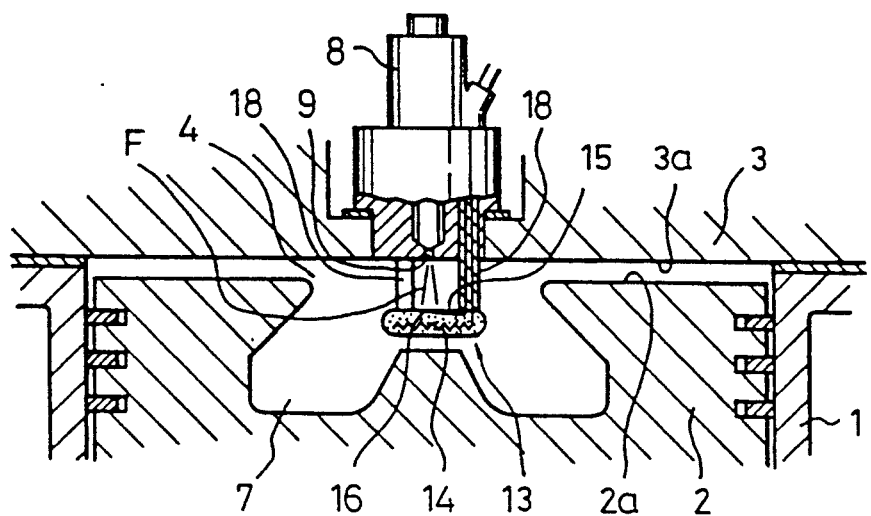
FIG. 5 is a side sectional view of a fourth embodiment of a hot surface impact ignition type internal combustion engine.

FIG. 5 shows a fourth embodiment. In this embodiment, the heating member 13 is supported through three support members 18 by the fuel injector 8. That is, in this embodiment, the heating member 13 is formed integrally with the fuel injector 8.

Figure 6:
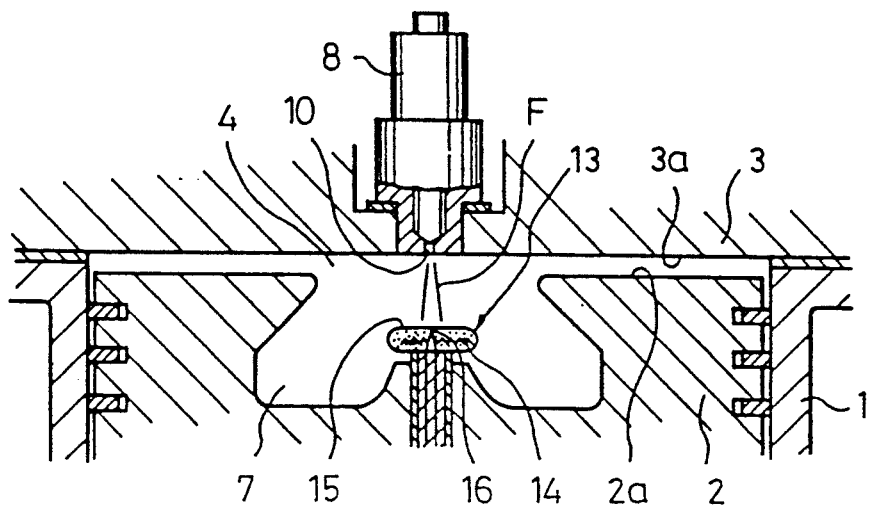
FIG. 6 is a side sectional view of a fifth embodiment of a hot surface impact ignition type internal combustion engine.

FIG. 6 shows a fifth embodiment. In this embodiment, the heating member 13 is supported by the center portion of the bottom wall surface of the cavity 7 formed in the piston 7.

Figure 7:
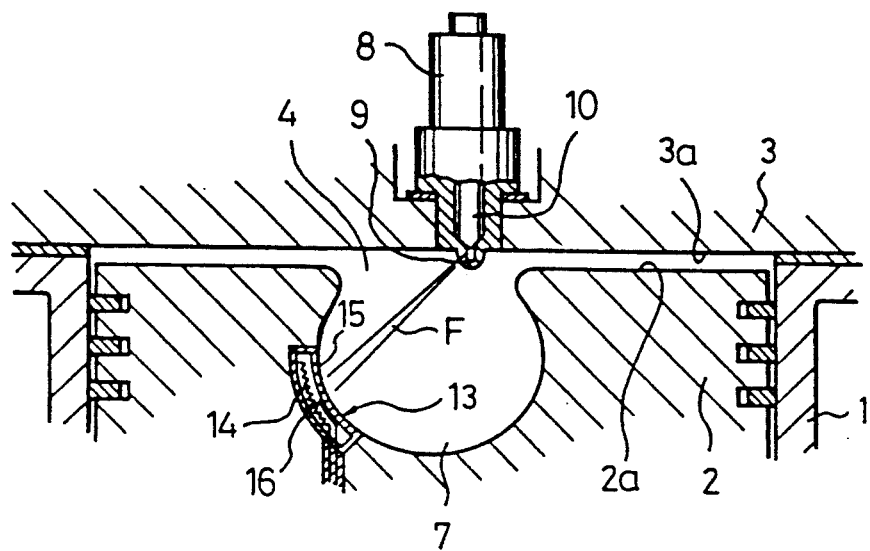
FIG. 7 is a side sectional view of a sixth embodiment of a hot surface impact ignition type internal combustion engine.

FIG. 7 shows a sixth embodiment. In this embodiment, a cavity 7 formed in the piston 2 forms substantially a spherical shape and a heating element 13 is arranged on the circumferential wall surface of the spherical cavity 7. The fuel is injected from the nozzle 9 of the fuel injector toward the heating surface 15 of the heating member 13 as shown by F.

Figure 8:
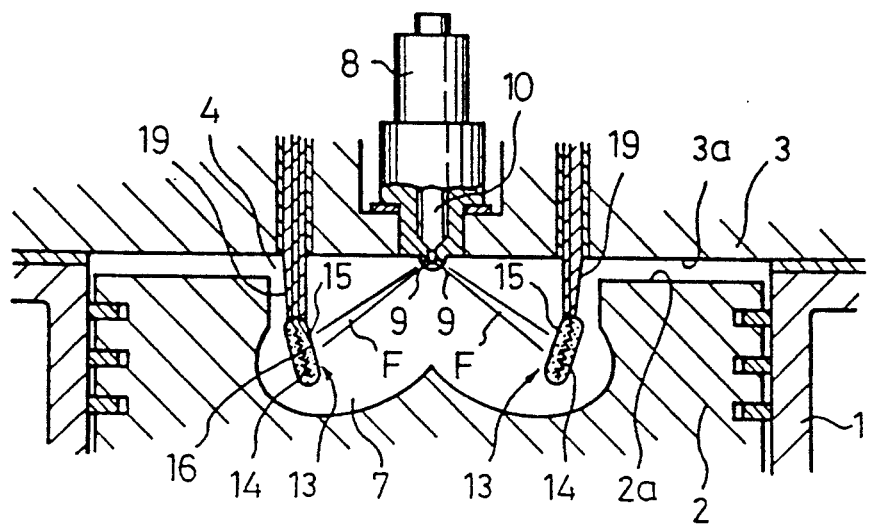
FIG. 8 is a side sectional view of a seventh embodiment of a hot surface impact ignition type internal combustion engine.

FIG. 8 shows a seventh embodiment. In this embodiment, a pair of heating members 13 are arranged at the circumference of the cavity 7, which heating elements 13 are supported through corresponding support members 19 by the cylinder head 3. Further, the fuel injector is provided with a pair of nozzles 9, with fuel being injected from the nozzles 9 toward the heating surfaces 15 of the corresponding heating members 13.

Figure 9:
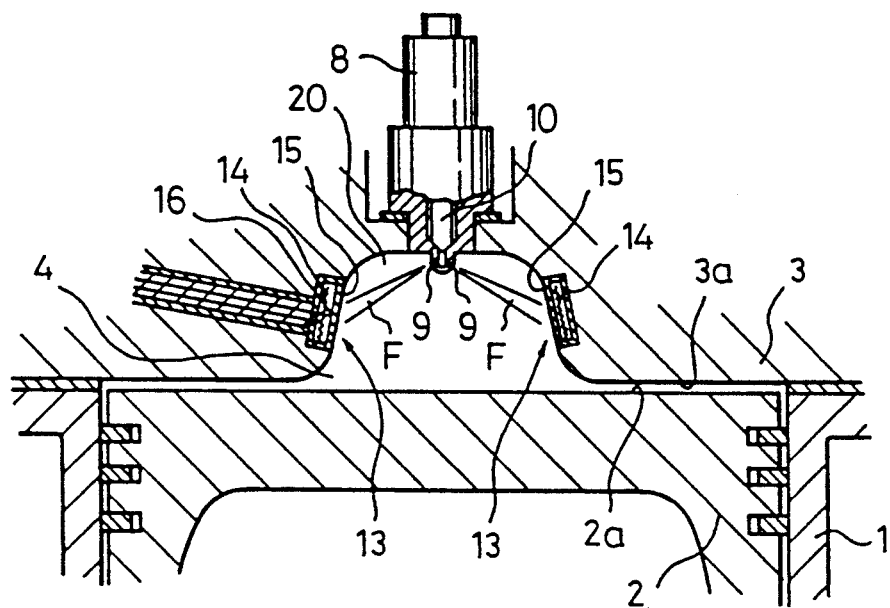
FIG. 9 is a side sectional view of an eighth embodiment of a hot surface impact ignition type internal combustion engine.

FIG. 9 shows an eighth embodiment. In this embodiment, the top surface 2a of the piston 2 is formed overall to be flat and a cavity 20 is formed at the center portion of the inner wall surface 3a of the cylinder head. At the inner wall surface of the cavity 20 are arranged a pair of heating members 13. The fuel injector is provided with a pair of nozzles 9, with fuel being injected from the nozzles 9 toward the heating surfaces 15 of the corresponding heating members 13.

Figure 10:
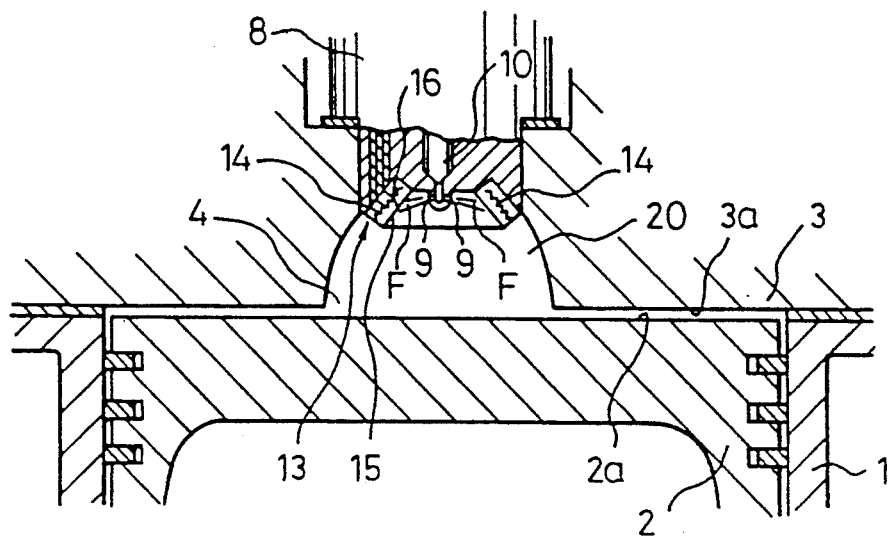
FIG. 10 is a side sectional view of a ninth embodiment of a hot surface impact ignition type internal combustion engine.

FIG. 10 shows a ninth embodiment. In this embodiment too, the top surface 2a of the piston 2 is formed overall to be flat and a cavity 20 is formed at the center portion of the inner wall surface 3a of the cylinder head. Further, in this embodiment, the heating member 13 forms a ring, the heating member 13 forming the ring being mounted to the tip portion of the fuel injector 8. The fuel injector 8 is provided with a plurality of nozzles 9, with fuel being injected from the nozzles 9 toward the heating surface 15 forming a conical shape.

Figure 11:
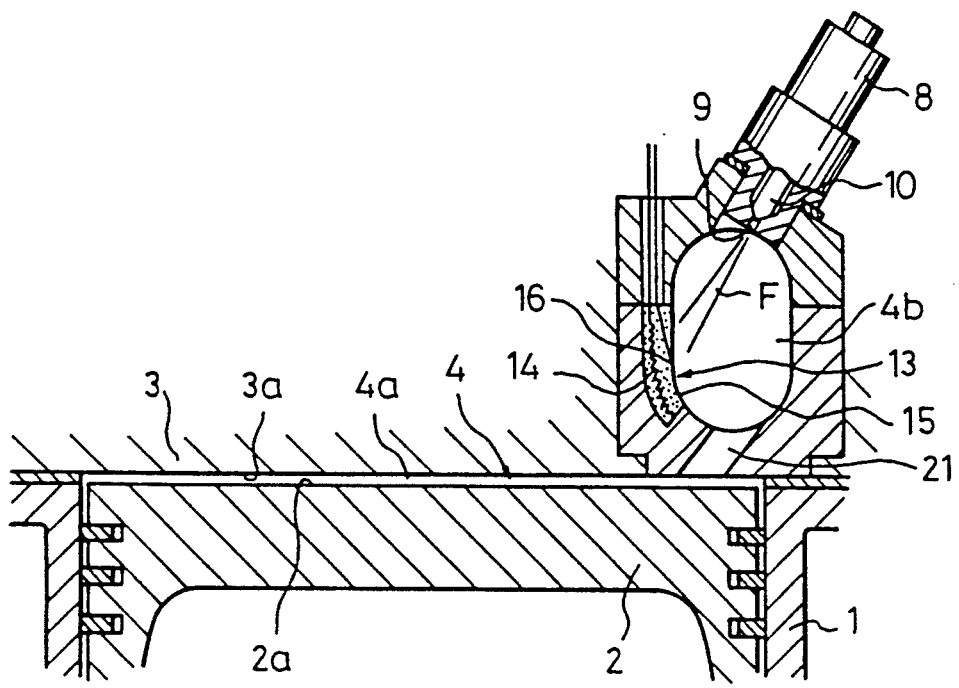
FIG. 11 is a side sectional view of a tenth embodiment of a hot surface impact ignition type internal combustion engine.

FIG. 11 shows a tenth embodiment. In this embodiment, the combustion chamber 4 is comprised of a main chamber 4a and a secondary chamber 4b connected to the main chamber 4a through an injection port 21, in which secondary chamber 4b there being arranged the nozzle 9 of the fuel injector 8. At the inner circumferential surface of the secondary chamber 4b is arranged the heating member 13. Fuel is injected from the nozzle 9 of the fuel injector 8 to the heating surface 15 of the heating member 13.

Figure 12:
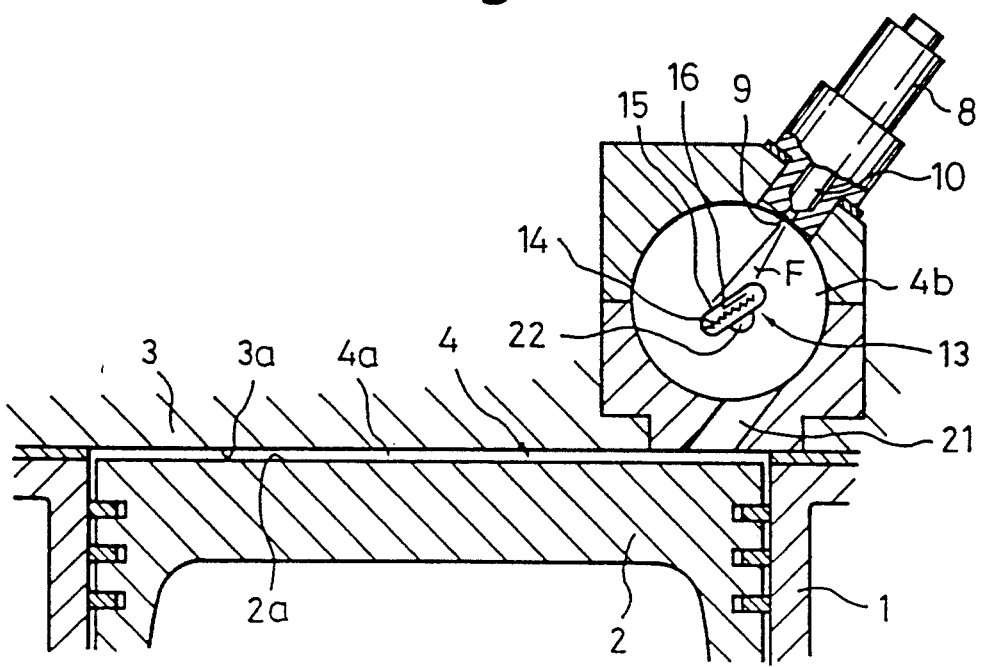
FIG. 12 is a side sectional view of an eleventh embodiment of a hot surface impact ignition type internal combustion engine.

FIG. 12 shows an eleventh embodiment. In this embodiment too, the combustion chamber 4 is comprised of main chamber 4a and a secondary chamber 4b connected to the main chamber 4a through an injection port 21, in which secondary chamber 4b there being arranged the nozzle 9 of the fuel injector 8. At the center portion of the secondary chamber 4b is arranged the heating member 13 supported through the support member 22 by the inner wall surface of the secondary chamber 4b. Fuel is injected from the nozzle 9 of the fuel injector 8 to the heating surface 15 of the heating member 13.

In each of the internal combustion engines shown in FIG. 1 to FIG. 12, use may be made of any type of fuel which can be used for an internal combustion engine, such as light oil, of course, and also gasoline, methanol, kerosene and fuel obtained by dissolving fine particles of coal in a liquid such as water. Further, in each of the internal combustion engines shown in FIG. 1 to FIG. 12, no throttle valve is provided in the intake passage and further there is no need to create a swirl inside the combustion chamber 4 or the main chamber 4a, so the intake resistance becomes smaller and in this sense too it is possible to raise the heat efficiency.

In all the embodiments, it is necessary to maintain the temperature of the heating surface 15 at the target temperature in order to shorten the ignition lag. There is an optimal value in the target temperature. This optimal value is about 650° C. or more, preferably about 800° C. but changes somewhat in accordance with the operating state of the engine. Next, an explanation will be made of the optimal target temperature based on FIG. 13.

Figure 13A:
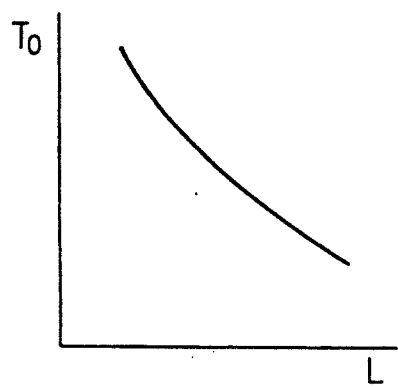
FIGS. 13(A)-13(D) are views showing a target temperature.

If the engine load L falls, the amount of injected fuel decreases and, further, the temperature inside the combustion chamber 4 or the secondary chamber 4b falls, so the harder the self-ignition. Therefore, as shown in FIG. 13(A), it is preferable to raise the target temperature $T_0$ of the heating surface 15 along with the reduction of the engine load L.

Figure 13B:
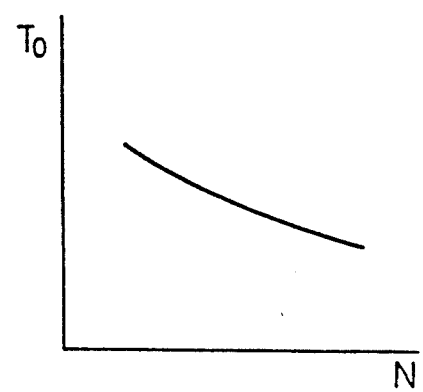
Figure 13C:
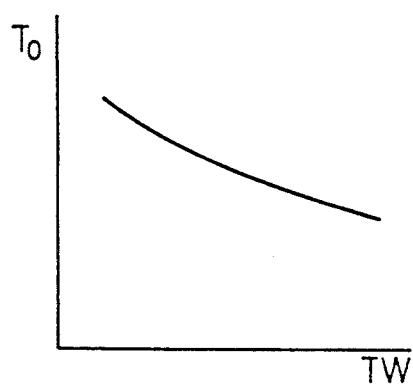

Further, the lower the engine rotation number N, the longer the interval of the explosive strokes and the lower the temperature inside the combustion chamber 4 or the secondary chamber 4b, so the harder the self-ignition. Therefore, as shown in FIG. 13(B), it is preferable to raise the target temperature $T_0$ of the heating surface along with the reduction of the engine rotation number.

Further, the lower the engine coolant water temperature, the more the intake air temperature drops and further the more the temperature inside the combustion chamber 4 of the secondary chamber 4b drops, so the harder the self-ignition. Therefore, as shown in FIG. 13(D), it is preferable that the target temperature $T_0$ of the heating surface 15 be raised along with the reduction of the engine coolant water temperature TW.

Figure 13D:
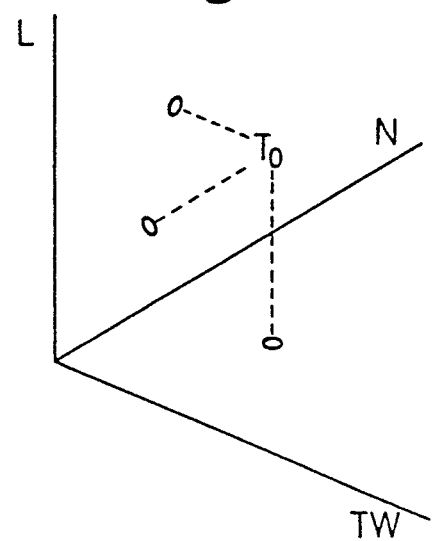

Therefore, the target temperature $T_0$ of the heating surface 15 is a function of the engine load L, engine rotation number N, and engine coolant water temperature TW as shown in FIG. 13(D).

Next, an explanation will be made of the method of control of the target temperature $T_0$ referring to FIG. 14 to FIG. 17.

Figure 14:
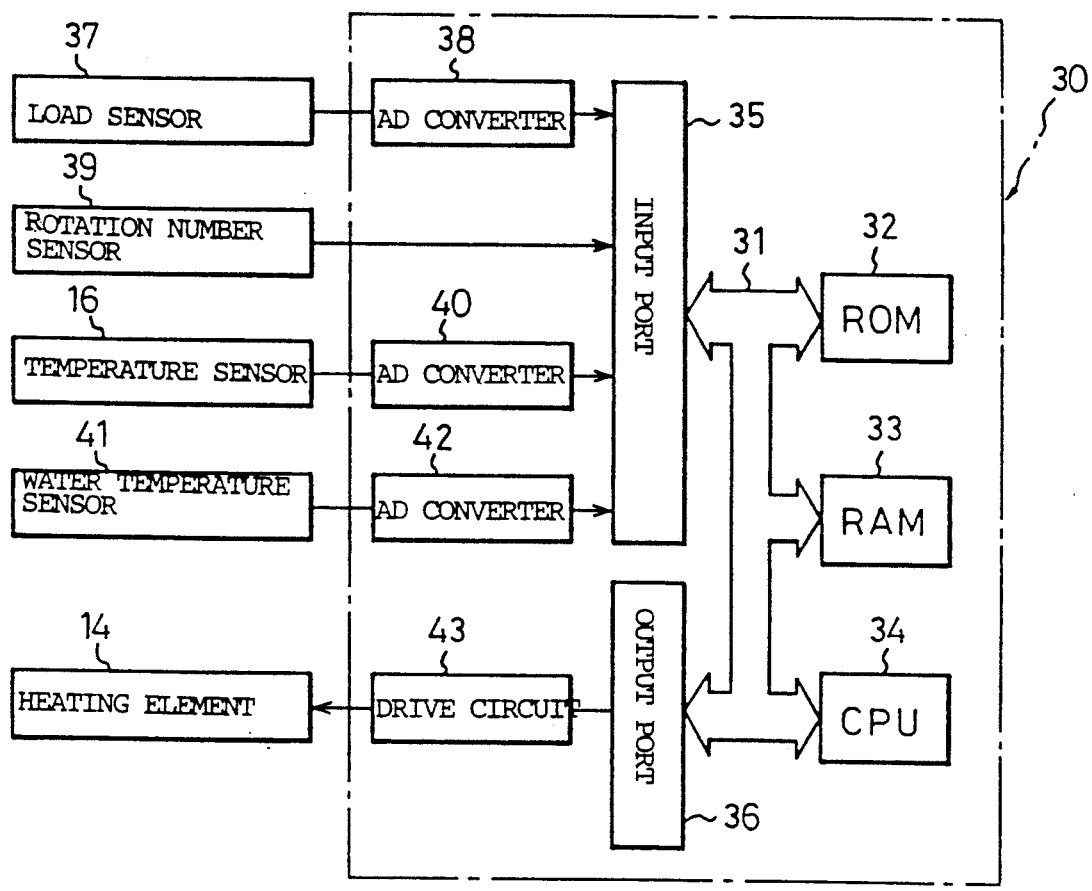
FIG. 14 is a circuit diagram of an electronic control unit.

FIG. 13 shows an electronic control unit used for the control of the target temperature $T_0$. As shown in FIG. 14, the electronic control unit 30 is comprised of a digital computer and is provided with a ROM (read only memory) 32, RAM (random access memory) 33, CPU (microprocessor) 34, input port 35, and output port 36, all mutually connected by a bidirectional bus 31. The load sensor 37 generates an output voltage proportional to the amount of depression of an accelerator pedal (not shown), that is, an output voltage proportional to the engine load L, which output voltage is input through an AD converter 38 to the input port 35. The rotation number sensor 39 generates output pulses every time the engine crankshaft rotates 30 degrees, for example, which output pulses are input to the input port 35. In the CPU 34, the engine rotation number N is calculated from the output pulses. The temperature sensor 16 generates an output voltage proportional to the temperature T of the heating surface 15, which output voltage is input through the AD converter 40 to the input port 35. The water temperature sensor 41 generates an output voltage proportional to the engine coolant water temperature TW. On the other hand, the output port 36 is connected through a drive circuit 43 to the heating element 14 of the heating member 13.

The relationship between the target temperature $T_0$, the engine load L, the engine rotation number N, and the engine coolant temperature TW shown in FIG. 13(D) is stored in advance in the ROM 33 in the form of a three-dimensional map. Therefore, the target temperature $T_0$ can be found based on the output signals of the load sensor 37, rotation number sensor 39, and water temperature sensor 41. The temperature T of the heating surface 15 of the heating member 13 is detected by the temperature sensor 16 and the heating element 14 is controlled so that the temperature T of the heating surface 15 becomes the target temperature $T_0$.

Figure 15:
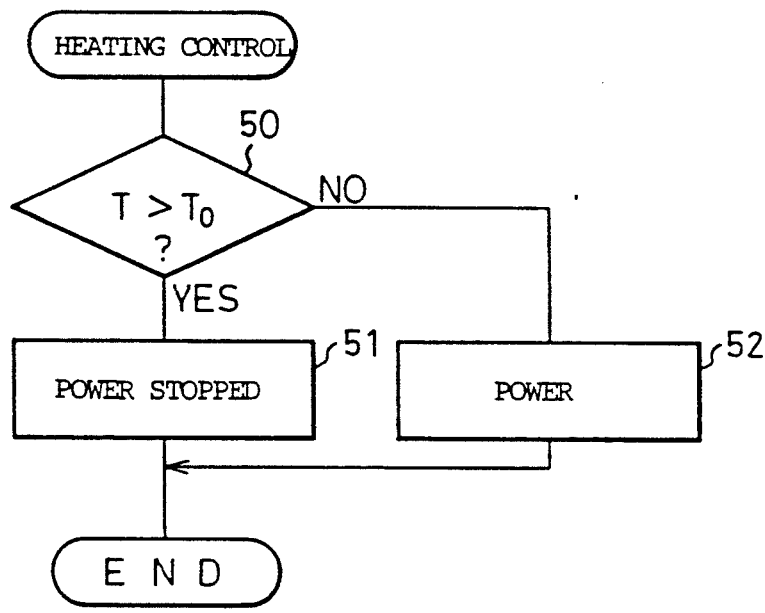
FIG. 15 is a flow chart of a first embodiment for heating control.

FIG. 15 shows a first embodiment of the heating control routine of the heating element 14, which routine is executed by interruption every fixed time period.

Referring to FIG. 15, first, it is judged at step 50 if the temperature T of the heating surface 15 is higher than a target temperature $T_0$. If $T > T_0$, the routine proceeds to step 52, where the heating element 14 is powered and as a result the heating element 14 can generate heat. In this way, the temperature T of the heating surface 15 is controlled to the target temperature $T_0$. Note that there are cases where the temperature T of the heating surface 15 continues to be higher than the target temperature $T_0$ even without powering of the heating element 14 due to the heat received from the burning gas in the case of high load operation of the engine. In this case, the routine advances from step 50 to step 51 where the powering of the heating element 14 continues to be stopped.

Figure 16:
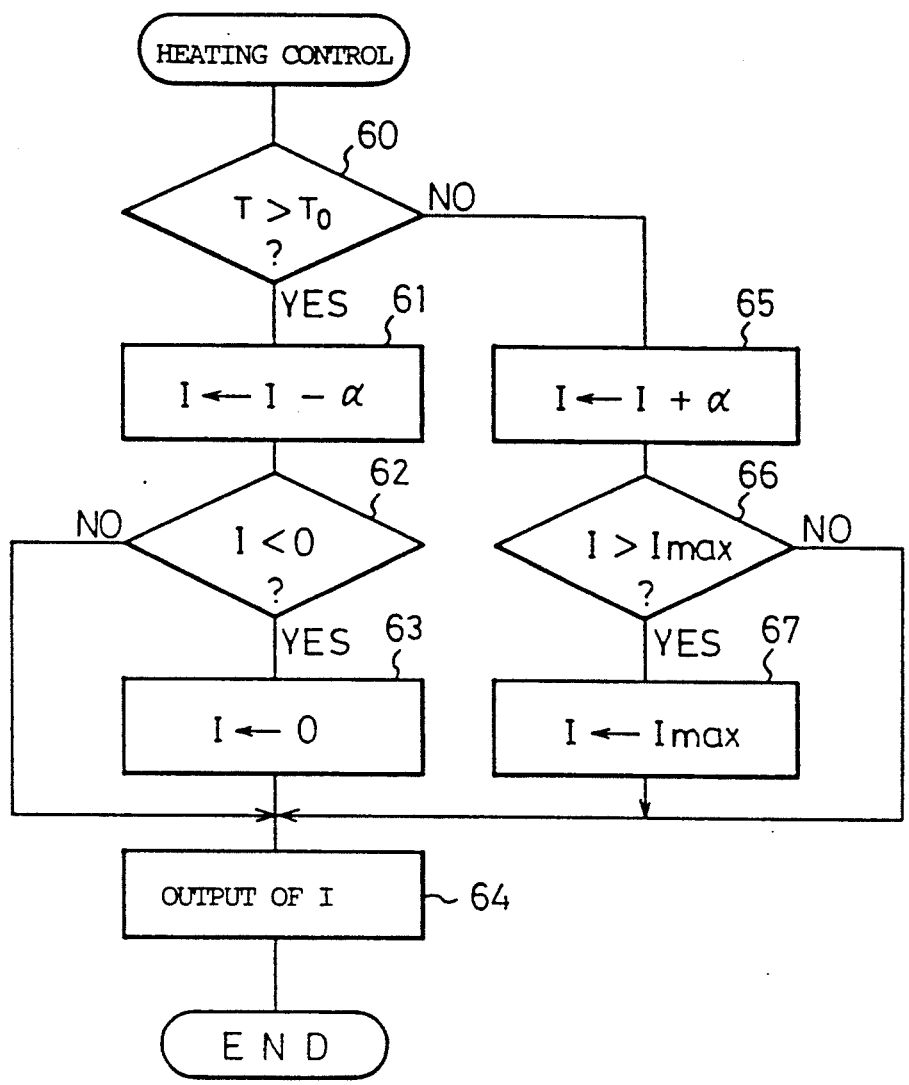
FIG. 16 is a flow chart of a second embodiment for heating control.

FIG. 16 shows a second embodiment of the heating control routine of the heating element 14, which routine is executed by interruption every fixed time period.

Referring to FIG. 16, first it is judged at step 60 if the temperature T of the heating surface 15 is higher than a target temperature $T_0$. When $T > T_0$, the routine proceeds to step 61, where the current I supplied to the heating element 14 can be reduced by the fixed value $a$. Note that the heating element 14 falls in the amount of heat generated if the current I supplied to the heating element 14 falls and increases in the amount of heat generated if the current I increases. Next, at step 62, it is judged if the current I is negative and if $I < 0$, the routine proceeds to step 63, wherein $I = 0$, and the routine proceeds to step 64.

On the other hand, when it is judged at step 60 that $T \leq T_0$, the routine proceeds to step 65 where the current I supplied to the heating element 14 can be increased by the fixed value $a$. Next, at step 66, it is judged if the current I is larger than the maximum allowable current $I_{max}$. If $I > I_{max}$, the routine proceeds to step 67, where I is made $I_{max}$, and the routine proceeds to step 64.

Figure 17:
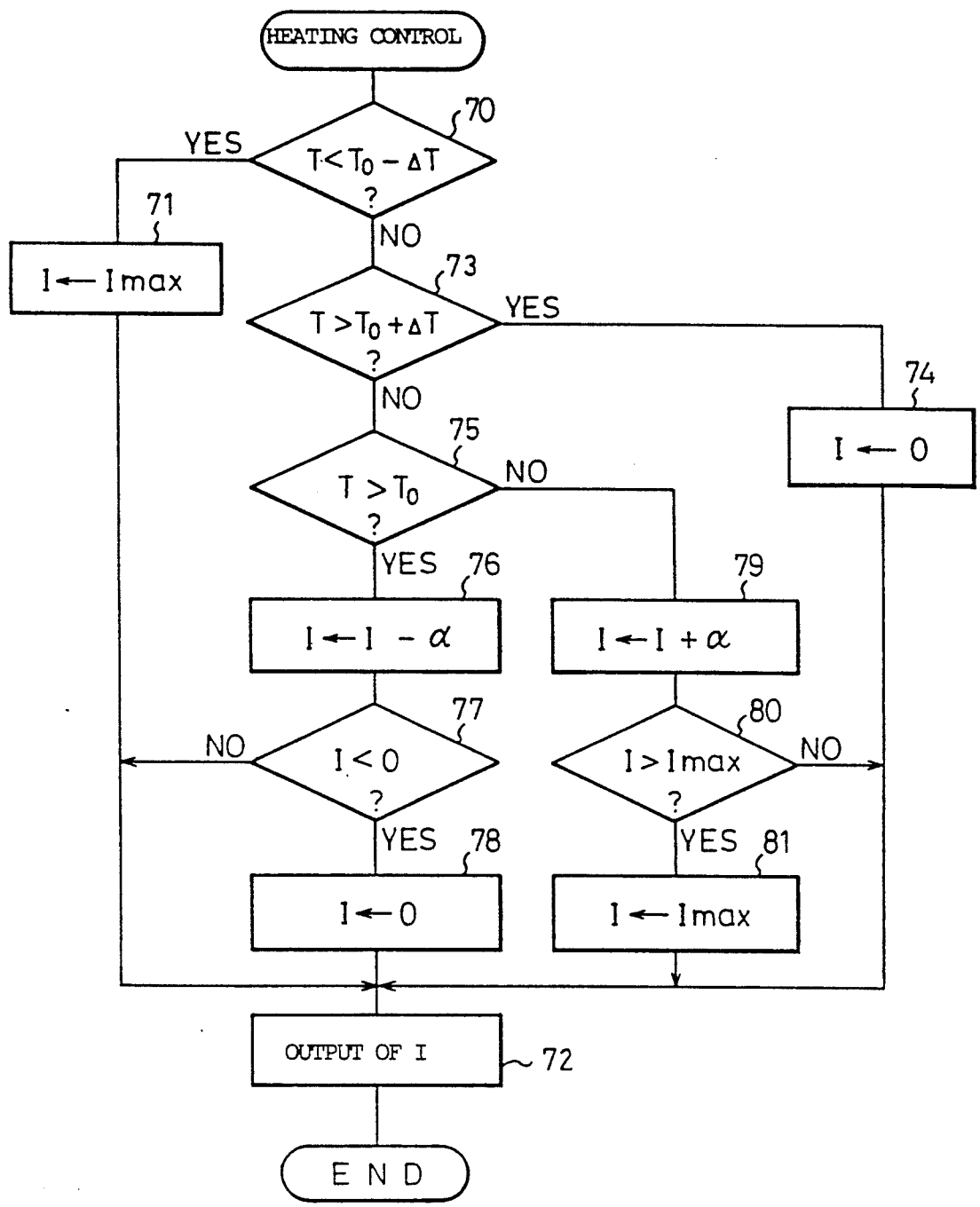
FIG. 17 is a flow chart of a third embodiment for heating control.

At step 64, the data showing the current I is output to the output port 36. Based on this data, the value of the current supplied to the heating element 14 is controlled. In this embodiment, the current I supplied to the heating element 14 is controlled so that the temperature T of the heating surface 15 becomes the target temperature $T_0$. Even in this embodiment too, the powering of the heating element can be stopped when the temperature of the heating surface 15 continues to be higher than the target temperature $T_0$ even if the heating element 14 is not powered due to the heat received from the burning gas. FIG. 17 shows a third embodiment of the heating control routine of the heating element 14, which routine is executed by interruption every fixed time period.

At step 72, the data showing the current I is output to the output port 36. Based on this data, the value of the current supplied to the heating element 14 is controlled. In this embodiment, when the temperature T of the heating surface 15 is lower by $\Delta T$ or more compared with the target temperature $T_0$, the current I is made the maximum allowable current $I_{max}$, so the heating member 13 can be rapidly heated. Therefore, it is possible to secure excellent combustion starting just after the engine startup. Further, when the temperature T of the heating surface 15 is higher by $\Delta T$ or more than the target temperature $T_0$, the current I is made zero and therefore the powering of the heating element 14 is stopped. Therefore, the powering of the heating element 14 can be stopped when the temperature of the heating surface 15 continues to be higher than $(T_0 + \Delta T)$ due to the heat received from the burning gas even if the heating element 14 is not powered. On the other hand, when $(T_0 + \Delta T) \geq T \geq (T_0 - \Delta T)$, the current I supplied to the heating element 14 is controlled so that the temperature of the heating surface 15 becomes the target temperature $T_0$.

As explained above, according to the present invention, by making the fuel strike a heating surface, the fuel particles receiving heat from the heating surface are activated, dispersed to the surroundings, and can be immediately ignited. Therefore, even if use is made of any fuel which can be considered usable for an internal combustion engine, such as light oil, of course, and also gasoline, methanol, kerosene, and fuel obtained by dissolving fine particles of coal in a liquid such as water, the ignition lag can be made extremely short and excellent combustion by self-ignition can be obtained.

I claim:

1. A hot surface impact ignition type internal combustion engine, comprising:
    a piston positioned at a top center portion of a combustion chamber and having a top face in which a cavity is formed, the cavity having a central portion; and
    an electrically heated heating member arranged in the combustion chamber and positioned at the central portion of the cavity of the piston, the heating member having a heating surface which is formed substantially flat and which extends in a direction perpendicular to an axial line of injected fuel, wherein fuel is injected from a fuel injector toward the heating surface of the heating member in the form of a continuous fluid stream, the fuel striking the heating surface in the form of an unatomized fluid.

2. A hot surface impact ignition type internal combustion engine as set forth in claim 1, wherein said heating member is comprised of a ceramic.

3. A hot surface impact ignition type internal combustion engine as set forth in claim 1, wherein provision is made of a heating element for heating the heating surface of said heating member and a control means for controlling the power supplied to the heating element so that the temperature of the heating surface becomes a target temperature.

4. A hot surface impact ignition type internal combustion engine as set forth in claim 3, wherein provision is made of a temperature detection means for detecting the temperature of the heating surface and said control means performs feedback control of the power supplied to the heating element so that the temperature of the heating element becomes said target temperature.

5. A hot surface impact ignition type internal combustion engine as set forth in claim 3, wherein said target temperature is about 650° C. or more.

6. A hot surface impact ignition type internal combustion engine as set forth in claim 5, wherein said target temperature is about 800° C.

7. A hot surface impact ignition type internal combustion engine as set forth in claim 3, wherein said target temperature is a function of at least one of an engine load, engine rotation number, and engine coolant water temperature.

8. A hot surface impact ignition type internal combustion engine as set forth in claim 1, wherein a fuel injection pressure may be made a low pressure of 100 kg/cm² to 150 kg/cm².

9. A hot surface impact ignition type internal combustion engine, comprising:
    a piston positioned at a top center portion of a combustion chamber and having a top face in which a cavity is formed, the cavity having a central portion; and
    an electrically heated disc-shaped heating member supported through a support member by a cylinder head and arranged in the combustion chamber and positioned at the central portion of the cavity of the piston, the heating member having a heating surface which extends in a direction perpendicular to an axial line of injected fuel, wherein fuel is injected from a fuel injector toward the heating surface of the heating member in the form of a continuous fluid stream, the fuel striking the heating surface in the form of an unatomized fluid.

10. A hot surface impact ignition type internal combustion engine as set forth in claim 9, wherein an electrical heating element is arranged in said heating member.

11. A hot surface impact ignition type internal combustion engine as set forth in claim 10, wherein said heating member is comprised of a ceramic.

12. A hot surface impact ignition type internal combustion engine as set forth in claim 9, wherein said heating member is comprised of a metallic heating plate and an electrical heating element is arranged in said support member to heat said metallic heating plate.

13. A hot surface impact ignition type internal combustion engine as set forth in claim 9, wherein said heating member is provided with a heat receiving portion with a large number of fins formed at a side opposite the heating surface.

14. A hot surface impact ignition type internal combustion engine as set forth in claim 9, wherein said heating member is comprised of ceramic.

15. A hot surface impact ignition type internal combustion engine as set forth in claim 9, wherein provision is made of a heating element for heating the heating surface of said heating member and a control means for controlling the power supplied to the heating element so that the temperature of the heating surface becomes a target temperature.

16. A hot surface impact ignition type internal combustion engine as set forth in claim 15, wherein provision is made of a temperature detection means for detecting the temperature of the heating surface and said control means performs feedback control of the power supplied to the heating element so that the temperature of the heating element becomes said target temperature.

17. A hot surface impact ignition type internal combustion engine as set forth in claim 15, wherein said target temperature is about 650° C. or more.

18. A hot surface impact ignition type internal combustion engine as set forth in claim 17, wherein said target temperature is about 800° C.

19. A hot surface impact ignition type internal combustion engine as set forth in claim 15, wherein said target temperature is a function of at least one of an engine load, engine rotation number, and engine coolant water temperature.

20. A hot surface impact ignition type internal combustion engine as set forth in claim 9, wherein a fuel injection pressure may be made a low pressure of 100 kg/cm² to 150 kg/cm².

* * * * *